(12) United States Patent
Caballero López et al.

(10) Patent No.: US 10,301,470 B2
(45) Date of Patent: May 28, 2019

(54) BIO-BASED AND BIODEGRADABLE POLYMER

(71) Applicant: SOCIEDAD ANÓNIMA MINERA CATALANO ARAGONESA, Saragossa (ES)

(72) Inventors: Miguel Ángel Caballero López, Saragossa (ES); María José Alfonso Alegre, Saragossa (ES); Patricia Zagalaz Lasierra, Saragossa (ES); Begoña Albors Ramos, Paterna (ES); Maria Consuelo Escrig Rondan, Paterna (ES)

(73) Assignee: SOCIEDAD ANONIMA MINERA CATALANO ARAGONESA, Saragossa (ES)

( * ) Notice: Subject to any disclaimer, the term of this patent is extended or adjusted under 35 U.S.C. 154(b) by 166 days.

(21) Appl. No.: 14/106,339

(22) Filed: Dec. 13, 2013

(65) Prior Publication Data

US 2014/0296389 A1 Oct. 2, 2014

(30) Foreign Application Priority Data

Mar. 26, 2013 (EP) .................................... 13001565

(51) Int. Cl.
*C08L 77/12* (2006.01)
*C08L 3/00* (2006.01)
*C08L 3/02* (2006.01)

(52) U.S. Cl.
CPC ................. *C08L 77/12* (2013.01); *C08L 3/00* (2013.01); *C08L 3/02* (2013.01)

(58) Field of Classification Search
CPC .............. C08L 77/12; C08L 3/00; C08L 3/02
USPC ......................................................... 524/52
See application file for complete search history.

(56) References Cited

U.S. PATENT DOCUMENTS

| 6,235,815 B1 | 5/2001 | Loercks et al. |
| 6,472,497 B2 | 10/2002 | Loercks et al. |
| 6,962,950 B1 | 11/2005 | Bastioli et al. |
| 7,241,832 B2 | 7/2007 | Khemani et al. |
| 2001/0039303 A1 | 11/2001 | Loercks et al. |
| 2003/0091803 A1* | 5/2003 | Bond ........................ D01F 6/46 428/292.1 |
| 2005/0154114 A1* | 7/2005 | Hale .......................... C08J 5/18 524/436 |
| 2005/0182196 A1 | 8/2005 | Khemani et al. |
| 2008/0221246 A1* | 9/2008 | Imam ........................ C08L 9/10 524/271 |
| 2010/0305240 A1 | 12/2010 | Schmidt et al. |

FOREIGN PATENT DOCUMENTS

| EP | 0947559 A2 | 10/1999 | |
| EP | 0950689 A2 | 10/1999 | |
| EP | 0965615 A1 | 12/1999 | |
| EP | 1347008 A2 * | 9/2003 | .......... B29C 67/205 |
| EP | 0937120 B1 | 9/2004 | |
| EP | 0950690 B1 | 1/2005 | |
| EP | 1526156 A2 | 4/2005 | |
| EP | 2270093 A2 | 1/2011 | |
| ES | 2380274 T3 | 5/2012 | |
| WO | 2008037749 A2 | 4/2008 | |

* cited by examiner

*Primary Examiner* — Kelechi C Egwim
(74) *Attorney, Agent, or Firm* — Notaro, Michalos & Zaccaria P.C.

(57) ABSTRACT

Bio-based and biodegradable polymer of the type used in the manufacture of films and injected or molded products, for example, for applications of containers, bags, healthcare products and films for agriculture or other applications in which the biodegrading characteristic is of interest, has a biodegradable polymer, thermoplastic starch in the co-continuous or continuous phase and at least one polymer that comes from a stable dispersion of the polymer in water or latex. This increases the thermoplastic starch content and thus decreases the biodegradable polymer and obtains films of a greater width by blow extrusion, with similar tensile properties. This provides the added advantage of a lower cost in raw materials, less impact on the environment and greater production.

8 Claims, 1 Drawing Sheet

BIO-BASED AND BIODEGRADABLE POLYMER

The present description, as its title indicates, refers to a bio-based and biodegradable polymer of the type used in the manufacture of films and injected or moulded products, for example, in applications for containers, bags, healthcare products and films for agriculture or other applications in which the biodegrading characteristic is of interest, characterized in that it basically comprises a biodegradable polymer, thermoplastic starch in co-continuous or continuous phase and at least one polymer that comes from a stable dispersion of said polymer in water or latex.

FIELD OF THE INVENTION

This invention relates to the field of bio-based thermoplastic polymers that use starch mixed with biodegradable polymers.

THE PRIOR ART

There is great interest in the development of thermoplastic starch-based polymers to replace polyolefins in applications in which it is valued that the product is compostable and/or biodegradable in certain conditions (to reduce the negative ecological impact of conventional plastics that remain in the environment for hundreds of years) and that it is obtained from renewable sources (to reduce oil consumption).

However, due to the nature of starch (high crystallinity, concentration of OH groups and hydrophilic nature) it does not have a thermoplastic behaviour; it cannot be subjected to typical plastic processing, such as for example, extrusion and injection and its properties vary with ambient humidity and over time; for this reason it is necessary to use plasticizers and/or to carry out mixes with other biodegradable polymers that are generally hydrophobic and not very compatible with starch.

Thus the starch content in mixtures with other polymers is limited, given that, above a certain value processing is not optimal (for example high blow-up ratios or low thicknesses in blown film cannot be obtained) and the properties of end products are not suitable (for example, they are too stiff and brittle and their properties vary depending on the ambient humidity). This limitation of bio-based content represents a greater ecological impact as well as a greater cost, since the cost of the biodegradable polymers used in the mixtures is much higher than the cost of starch.

BACKGROUND OF THE INVENTION

At the current time the existence of numerous thermoplastic products that employ starch in their composition is widely known. Thus, for example, patents EP0947559B1 and EP0950689 describe biodegradable compositions based on thermoplastic starch and a thermoplastic polymer that is incompatible with starch, with good resistance to humidity or to impacts in which the starch constitutes the dispersed phase and the thermoplastic polymer constitutes the continuous phase, but they do not consider mixtures with natural or synthetic latex polymers in aqueous dispersion, nor with starch in co-continuous or continuous phase, nor the advantages that these may represent.

Patents EP0937120B1, EP1526156, EP2270093, EP0965615A1 and EP0950690B1, as in the previous patents, also describe biodegradable compositions based on thermoplastic starch and a thermoplastic polymer incompatible with the starch, in which the starch constitutes the dispersed phase and the thermoplastic polymer constitutes the continuous phase, and they also require an interfacial agent such as polyhydric alcohol esters, non-ionic water-soluble surfactants or products of the reaction of diisocyanates with polymers with terminal groups capable of reacting with isocyanates. Neither do these patents contemplate mixtures with polymers in aqueous dispersion, of the natural or synthetic latex type, nor with starch in co-continuous or continuous phase, nor the advantages that these can provide.

Also known are certain patents such as WO037749A2, which use a procedure based solely on the size of the particles to guarantee the mixture. However, they do not contemplate mixtures with polymers in aqueous dispersion, of the natural or synthetic latex type, nor with starch in co-continuous or continuous phase, nor the advantages that these can provide compared to the complexity of having to control the size of the particle in the mixture.

Furthermore there are patents U.S. Pat. No. 0,182,196A1 and U.S. Pat. No. 7,241,832B2, which describe mixtures of thermoplastic biodegradable polymers with enhanced properties compared to their constituent polymers. In particular, mixtures of biodegradable thermoplastic polymers such as ECOFLEX, BIOMAX AND PLA with thermoplastic starch. However, they do not contemplate mixtures with polymers in aqueous dispersion, of the natural or synthetic latex type, nor with starch in co-continuous or continuous phase, nor the advantages that these can provide.

Moreover, in the examples of US2005/0182196, the maximum thermoplastic starch content is 50%, while in our invention it amounts to 57% thanks to the presence of latex.

On the other hand there are patents U.S. Pat. No. 0,039,303A1, U.S. Pat. No. 6,472,497B2 and U.S. Pat. No. 6,235,815B1 that describe the use of biodegradable thermoplastic polymers as starch plasticizers, allowing thermoplastic starch to be obtained without the need to use low molecular weight plasticizers such as glycerine.

However, they do not contemplate mixtures with polymers in aqueous dispersion, of the natural or synthetic latex type, nor with starch in the co-continuous or continuous phase, nor the advantages that these can provide.

Moreover, in the examples of U.S. Pat. No. 0,039,303A1, U.S. Pat. No. 6,472,497B2 and U.S. Pat. No. 6,235,815B1, the maximum thermoplastic starch content is 52.5%, while in our invention it amounts to 57% thanks to the presence of latex.

There also exists U.S. Pat. No. 6,962,950B1 that describes mixtures of a hydrophobic polymer matrix, incompatible with starch, with a starch complex and a coupling agent that has groups that are compatible with the starch complex and with the hydrophobic polymer.

It needs to use, as the complexing agent, polylactic acid, polyglycolic acid, poly (lactic-glycolic) acid copolymers, ethylene-acrylic acid copolymers, ethylene-vinylacetate copolymers as well as copolymers of ethylene with polar monomers.

It cites, as the coupling agent, vinyl silanes, alkyl titanate and bis-3-triethoxysilylpropyl tetrasulphide.

It does not contemplate mixtures with polymers in aqueous dispersion, of the natural or synthetic latex type, nor with starch in co-continuous or continuous phase, nor the advantages that these can provide. Neither does it give any information on the properties of the films that are achieved.

Furthermore, it mentions that the maximum content of starch complex dispersed in the hydrophobic polymer matrix is 50%, while in our invention we achieve up to 57% thermoplastic starch thanks to the presence of latex.

Also known are patents ES2380274 T3 and U.S. Pat. No. 0,305,240A1 that describe a polymeric material containing starch or a starch derivative, polyester and a polymer that contains epoxide groups, especially recommended are copolymers that contain glycidyl methacrylate. In this polymeric material the starch is in the dispersed phase and the polyester is in the continuous phase. The epoxide groups create an intramolecular and intermolecular chemical association of starch and polyester which enhances the mechanical properties of films, allowing the thermoplastic starch content to be increased from 33% to 40% (7%), while maintaining suitable mechanical properties.

It does not contemplate mixtures with polymers in aqueous dispersion, of the natural or synthetic latex type, nor with starch in co-continuous or continuous phase. In our invention the addition of latex makes it possible to increase the thermoplastic starch content to up to 57%, obtaining films with suitable properties for applications such as bags, wrappings for healthcare products, films and products for agriculture, injected parts, moulded parts . . . .

DESCRIPTION OF THE INVENTION

In order to solve the problems that exist with the manufacture of biodegradable films, improving the current state of the art, the bio-based and biodegradable polymer that is the subject matter of this invention has been devised, basically comprising a biodegradable polymer, thermoplastic starch in co-continuous or continuous phase and at least one polymer that comes from a stable dispersion of said polymer in water or latex.

The latex can be synthetic latex, natural latex, or a combination thereof.

The starch can be native, chemically modified, or a mixture thereof.

The use of this bio-based and biodegradable polymer is particularly suitable for the manufacture of films for containers, bags, healthcare products and agriculture, as well as products made by extrusion, moulding or injection. It can be processed by injection and has properties that are similar to low density polyethylenes LDPE used in injection.

In this product the starch is not in the dispersed phase but rather in the co-continuous or continuous phase, indicating that the thermoplastic starch content is much greater than that of the products known in the current state of the art.

Advantages of the Invention

This bio-based and biodegradable polymer that is presented provides numerous advantages over currently available systems, the most important being that it is possible to increase the thermoplastic starch content and thus reduce the biodegradable polymer, and even so, obtain films by blow extrusion that have a greater width and have similar tensile properties.

This provides the added advantage of a lower cost in raw materials, less impact on the environment and greater production.

It is important to note that by greatly increasing the thermoplastic content, wider films are obtained with similar thicknesses and elongation to break, although in some cases break strength is slightly lower, but adequate for containers, bags, healthcare products and agriculture as well as for extrusion, moulding and injection applications. It has even been found that for said high contents of thermoplastic starch it is possible to improve break strength with certain compositions of the invention.

Another important advantage is that with the same thermoplastic starch content, the films have a greater elongation to break, resulting in more flexible materials that are particularly suitable for certain applications such as household films, padding and secondary and tertiary containers.

It is also important to underline that, with the same thermoplastic starch content, films with a greater width can be achieved, which means greater production, whilst maintaining suitable tensile properties for many applications such as those previously mentioned.

Lastly we cannot fail to mention the advantage represented by the fact that, with even greater thermoplastic starch content, films of lower thickness and greater width can be produced. Films of greater width mean greater production and less thickness allows more economic, lighter containers to be produced.

DESCRIPTION OF THE FIGURES

To provide a better understanding of the present invention, the attached images display the results of the tests performed on a bio-based and biodegradable polymer according to the invention, in comparison with commercial products.

In said drawing, FIG. 1—shows a film, according to the invention, consisting of 57% thermoplastic starch+42% biodegradable polymer+1% of a polymer from a latex, before and after treating it with HCl 5M, which dissolves the starch.

PREFERRED EMBODIMENT OF THE INVENTION

Figure 1:
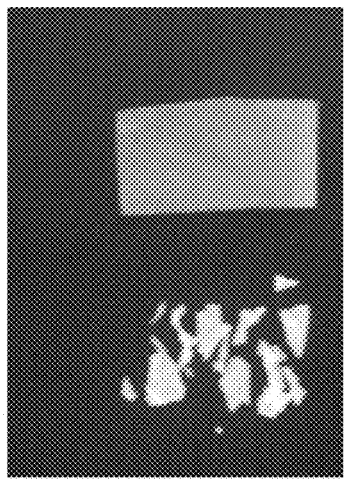

The bio-based and biodegradable polymer that is the subject matter of the present invention basically comprises a biodegradable polymer, in a proportion of <60% by weight, thermoplastic starch in co-continuous or continuous phase, in a proportion of >=30% by weight, and at least another polymer coming from a stable dispersion of said polymer in water or latex, in a proportion of between 1 and 10% by weight.

The latex can be synthetic latex, natural latex or a combination thereof. The natural latex, also called "natural rubber" is preferably extracted from *Hevea Brasiliensis*, from *Manilkara Bidentata*, from *Manilkara Zapota* and/or from *Palaquium Oblongifolia* trees.

The type of synthetic latex is styrene-butadiene, acrylonitrile butadiene styrene, homopolymers or copolymers of acrylic and methacrylic esters or a combination thereof, preferably copolymers of acrylic esters.

The very nature the latex polymer as well as the labile groups that it contains, means that it acts as a binder between the thermoplastic starch and the biodegradable polymer. Furthermore, the elasticity of the latex polymer allows an improvement of the elastic properties of the compositions that comprise thermoplastic starch and biodegradable polymers. The labile groups of the latex polymer are chosen from the carboxyl, anhydride, alcohol, carbodiimide and oxazoline group.

The biodegradable polymer is selected from the group formed by aliphatic-aromatic copolyesters, polylactic acid, polyhydroxybutyrate, polyhydroxybutyrate-hydroxyvalerate copolymers, aliphatic copolyesters, aliphatic polyesters including units formed from a hydroxy acid, polyesters including units formed from glycolide, lactide and [epsilon]-caprolactone, polyester-urea, polyester amides, polyesteretheramides, particularly aliphatic-aromatic polyesteretheramides, and mixtures thereof. Examples of these biodegradable polymers are: polyhydroxybutyrate-hydroxyvalerate, poly(butylene adipate co-terephthalate), poly(alkylene sebacate), poly(butylene succinate, poly(butylene adipate-co-succinate), poly(butylene adipate), poly(alkylene adipate)-caprolactam, poly(alkylene adipate)-epsilon-caprolactone, poly-epsilon-caprolactone, poly(ethylene succinate/butylene succinate), poly(diphenol-diglycidyl-ether adipate), poly(lactic acid), poly(alkylene adipate), poly (alkylene adipate-succinate), poly (epsilon-caprolactone/epsilon-caprolactam), poly(alkylene azelate) and their copolymers or mixtures thereof.

The biodegradable polymer is preferably a polyesteretheramide that contains a compound with at least 3 groups capable of reacting with one or several types of the active groups present in the reaction mass, that is, compounds which contain ether groups in their structure and have active groups that are capable of reacting in the reaction mass, to form amide groups.

The thermoplastic starch comprises starch and a plasticizer. This plasticizer is selected from the group formed by polyhydric alcohols, ethers, thioethers, the esters of these or a combination thereof. Examples of usable plasticizers are: glycerine, polyethylene glycol, ethylene glycol, neopentyl glycol, sorbitol monoacetate, sorbitol diacetate, sorbitol monoethoxylate, ethoxylated polyglycerol, sorbitol diethoxylate, 1,2-propanediol, 1,3-propanediol, 1,4-butanediol and mixtures thereof.

The starch can be native, chemically modified or a mixture thereof. The native starch can come, for example, from potato, rice, tapioca, corn, or be formed by a mixture thereof. The chemically modified starch can be, for example, starch acetate, ethoxylated starch, reticulated hydroxypropyl starch, oxidized starch, dextrin and mixtures thereof.

In a preferred embodiment the thermoplastic starch comprises corn starch and glycerine.

Optionally, the composition can also contain cellulose, proteins, gluten and natural fibres. Furthermore it can contain additives such as flame retardants, UV protectors, antioxidants, lubricants, anti-blocking and slip agents, organic or inorganic filler, organic or inorganic porous capsules, bentonite or sepiolite type clays, fungicides, herbicides, fertilizers, preservatives, anti-microbial agents, odour absorbers, color correctors, as well as any other additive incorporated to improve the processing and end properties of the product.

The use of this bio-based and biodegradable polymer is particularly suitable for the manufacture of films for containers, bags, healthcare products and agriculture, as well as products made by extrusion, moulding or injection.

The preparation process for the bio-based polymer comprises the following characteristics:

To obtain a thermoplastic starch, plasticizers can be added, low molecular weight polymers can be used, or simply the starch itself can be used as the plasticizer.

The starch and the plasticizer can be mixed prior to being fed into the extruder where they will be mixed with the biodegradable polymer, or they can be fed directly into the extruder with the starch, the plasticizer and the biodegradable polymer and mixing is carried out in situ.

The biodegradable polymer can be added at the start of the extruder together with the starch or at a zone that is further ahead of the extruder.

The latex can be previously mixed with the starch and the plasticizer, or added directly to the extruder where it will be mixed with the starch and the biodegradable polymer.

The extrusion temperatures depend on the biodegradable polymers used, being in general <260° C., preferably <150° C.

It is recommended to condition the polymer obtained in the extrusion so that it has a moisture content of <6%, particularly recommending <2% for its correct subsequent processing in film extrusion or injection.

The experimental trials that have been performed have shown that in the invention product, the thermoplastic starch is not in the dispersed phase, as in conventional products, but rather it is in the co-continuous or continuous phase, which indicates that the thermoplastic starch content of the product of our invention is much higher than that of the products of the aforementioned patents.

Figure 2:
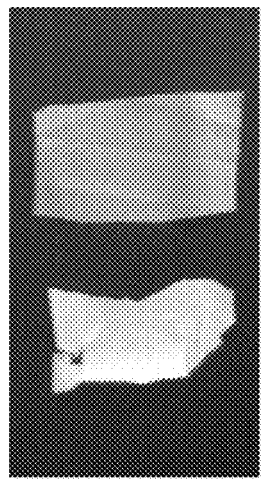
FIG. 2—shows a film, according to the invention, consisting of 40% thermoplastic starch+59% biodegradable polymer+1% of a polymer from latex, before and after treating it with HCl 5M, which dissolves the starch.
Figure 3:
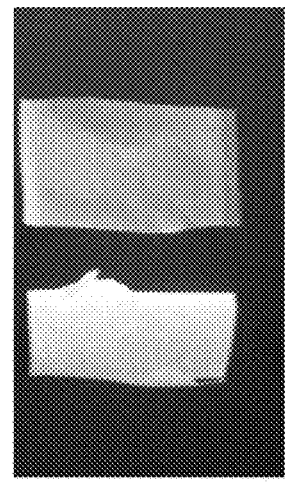
FIG. 3—shows a conventional commercial film of thermoplastic starch and biodegradable polymer, without latex, before and after treating it with HCl 5M, which dissolves the starch FIG. 4—shows a view through an electron microscope (SEM) of a film according to the invention, consisting of 57% thermoplastic starch+42% biodegradable polymer+1% of a polymer from a latex, after treating it with HCl 5M, which dissolves the starch.

The procedure followed was:

The 50 micron films obtained in a blown film extruder with:

FIG. 1—57% TPS (thermoplastic starch) +42% polyesteretheramide +1% polymer from latex FIG. 2—40% TPS (thermoplastic starch) +59% polyesteretheramide +1% polymer from latex FIG. 3—Mixture of thermoplastic starch/commercial biodegradable thermoplastic polymer FIG. 5—52% TPS (thermoplastic starch) +47% polyesteretheramide +1% polymer from latex have been treated with HCl 5M, which dissolves the starch but not the polyesteretheramide.

Prior to this a polyesteretheramide film was treated to check that it did not dissolve in HCl 5M. The films were weighed before and after treatment with HCl and the weight loss was calculated. In the case of the films with 52 and 57% of thermoplastic starch, the weight loss was very similar to the thermoplastic starch content of the films before being treated with HCl, confirming that all of the thermoplastic starch had been dissolved. In the case of the film with 40% thermoplastic starch, the loss was lower than the thermoplastic starch content of the film before treating it with HCl, indicating that polyesteretheramide covers the particles of thermoplastic starch preventing them from dissolving.

FIG. 1—The film with 42% of polyesteretheramide breaks into small pieces, indicating that the starch is not in the dispersed phase but rather in the co-continuous or continuous phase, since if the starch had been in the dispersed phase and the polyesteretheramide in the continuous phase, the structure of the film would have been maintained.

Figure 5:
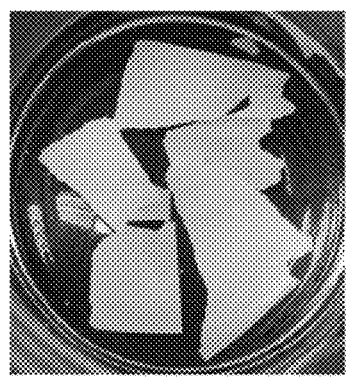
FIG. 5—shows a film according to the invention, with 52% thermoplastic starch+47% biodegradable polymer+1% of a polymer from latex before and after treating it with HCl 5M, which dissolves the starch.

FIG. 5—The film with 47% of polyesteretheramide breaks into small pieces, indicating that the starch is not in the dispersed phase but rather in the co-continuous or continuous phase, since if the starch had been in the dispersed phase and the polyesteretheramide in the continuous phase, the structure of the film would have been maintained.

FIG. 2—The film with 59% of polyesteretheramide maintains its structure, indicating that the starch is in the dispersed phase and the polyesteretheramide in the continuous phase. This fact was also confirmed when it was seen that the weight loss of the film following treatment with HCl was lower than the thermoplastic starch content of the film before treating it with HCl, indicating that that the polyesteretheramide was in the continuous phase, covering the particles of the thermoplastic starch which were in the dispersed phase, prevent them from dissolving.

FIG. 3—The film made with the commercial mixture, maintains the structure even better than that which contains 59% of polyesteretheramide, probably due to the fact that the thermoplastic starch content is less than 40%.

Figure 4:
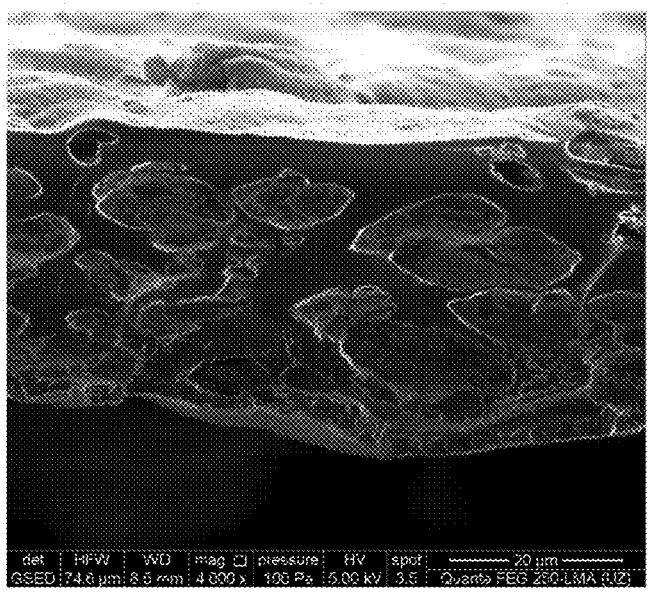

In view of the results, a cross-section was carried out on the film with 42% polyesteretheramide treated with HCl 5M and it was observed through an electron microscope (SEM). FIG. 4 shows the gaps where the starch was, confirming that it was in the co-continuous or continuous phase.

Furthermore, comparative analyses of mechanical properties have been performed, as indicated in the following table 1:

The following conclusions have been reached from these analyses and measurements:

A—It is possible to increase the thermoplastic starch content by 17% (and thus reduce the biodegradable polymer by the same percentage), and still obtain films by blow extrusion that have a greater width and similar tensile properties.

The thermoplastic starch content was increased from 40%, this being a typical value in the current mixtures on the market (Example 1), to 52% (Examples 3 and 4), reducing the biodegradable polymer content from 60 to 48%.

When the biodegradable polymer was a commercial PBAT (example 4) a very stiff product was obtained and it was not possible to obtain a film by blow extrusion. However, when 1% of polymer from latex (Example 5) was added, films were produced with a width, thickness and properties similar to those that contain 60% of polymer (Example 1).

When the biodegradable polymer was a polyesteretheramide according to EP12001068.1 (Example 3), films could be obtained although the width decreased by 24% compared

TABLE 1

INJECTION MOULDING

| Product | Method | Unit | LDPE | LDPE | Invention Product |
|---|---|---|---|---|---|
| % TPS/% Polyesteretheramide/% Latex | | % | — | — | 52/47/1 |
| Density | ISO1183 | Kg/m$^3$ | 919 | 920 | 1250 |
| Melt flow index | ISO1183 | cc/10 min | 29 | 10 | 3-7 |
| ° C. | | | 190 | 190 | 190 |
| Kg | | | 2.16 | 2.16 | 2.16 |
| Thermal properties | | | | | |
| Melting point | ISO11357-1/3 | ° C. | 110 | 110 | 110-130 |
| Mechanical properties | | | | | |
| Barrel temperature | | ° C. | 160 | 160 | 200 |
| Mould temperature | | ° C. | 20-40 | 20-40 | 20-30 |
| Thickness | | microns | 2 | 2 | 4 |
| Yield stress | ISO527-2 | Mpa | 8 | 8 | 7 |
| Breaking stress | ISO527-2 | Mpa | 7 | 10 | 10 |
| Elongation at break | ISO527-2 | % | 400 | 120 | >430 |
| Tensile modulus | ISO527-2 | Mpa | 175 | 130 | 100 |

Table 1 shows how the invention polymer can be processed by injection, presenting similar processing and properties to LDPE low-density polyethylenes used in injection.

An analysis of the processing and properties of films obtained by blow extrusion was also performed, as shown in table 2:

to those containing 60% of polymer (from 22.5 to 17 cm). However, when 1% of a polymer from a latex was added (Example 6) films of a greater width were produced (25.5 cm versus 22.5 cm).

It was even possible to increase the thermoplastic starch content to 57% (Example 7), maintaining 1% of polymer

TABLE 2

| EXAMPLE | 1 | 2 | 3 | 4 | 5 | 6 | 7 | 8 | 9 | 10 | 11 |
|---|---|---|---|---|---|---|---|---|---|---|---|
| TPS (Thermoplastic starch), % | 40 | 40 | 52 | 52 | 52 | 52 | 57 | 46 | 55 | 58 | 57 |
| Polyesteretheramide, % | 60 | 59 | 48 | 0 | 0 | 47 | 42 | 0 | 42 | 0 | 0 |
| PBAT, % | 0 | 0 | 0 | 48 | 47 | 0 | 0 | 48 | 0 | 0 | 0 |
| PBSA, % | 0 | 0 | 0 | 0 | 0 | 0 | 0 | 0 | 0 | 42 | 42 |
| Polymer from a latex, % | 0 | 1 | 0 | 0 | 1 | 1 | 1 | 5 | 3 | 0 | 1 |
| Film width, cm | 22.5 | 27 | 17 | * | 24 | 25.5 | 23.5 | 28 | 23 | * | 24 |
| Film thickness, microns | 50 | 50 | 50 | | 50 | 50 | 50 | 35 | 50 | | 50 |
| Tensile EN ISO527-3 | | | | | | | | | | | |
| Break strength, Mpa | 10 | 11 | | | 12 | 8.5 | 8 | 9.8 | 14 | | 12 |
| Deformation to break, % | 500 | 610 | | | 500 | 510 | 500 | 410 | 590 | | 200 |

* = Could not be processed from a latex, achieving films of a similar width, thickness and elongation to break. Break strength was slightly less, but suitable for many applications such as bags, containers, wrappings for healthcare products and injection applications. When the content of the polymer from latex was increased to 3% (Example 9) the properties improved, achieving even better properties than compositions with just 40% thermoplastic starch (Example 1).

When the biodegradable polymer was PBSA, poly(butylene adipate-co-succinate) and the thermoplastic starch content was 58%, a very rigid product was obtained, it not being possible to obtain a film by blow extrusion (Example 10). However, when 1% of polymer from latex (Example 11) was added, the films produced had widths, thicknesses and properties similar to those containing 60% of polymer (Example 1) and with suitable properties for the aforementioned applications.

B—With the same bio-based content, the films have a greater elongation to break.

For a thermoplastic starch content of 40%, 1% of PBAT type biodegradable polymer was replaced by latex (Example 2 versus example 1) and the elongation to break increased from 500 to 610%, obtaining more flexible materials that were particularly suitable for certain applications such as household films, padding and secondary and tertiary containers. The values of the rest of the properties remained very similar.

C—For the same thermoplastic starch content, wider films can be obtained, which represents greater production.

For a thermoplastic starch content of 40%, 1% of biodegradable polymer was replaced by latex (Example 2 versus example 1) and the width of the film increased by 20%. The values of the rest of the properties remained similar.

For a thermoplastic starch content of 52%, 1% of biodegradable polymer was replaced by latex (Example 3 versus example 6) and the width of the film increased by 50%, maintaining tensile properties suitable for many applications, such as those previously mentioned.

D—With an even greater thermoplastic starch content films with a lower thickness and greater width can be produced.

For a thermoplastic starch content of 46%, 5% of biodegradable polymer was replaced by latex (Example 8), obtaining films with a greater width and lower thickness than with a thermoplastic starch content of 40% without latex (Example 1), and with similar properties. Greater film width means greater production. Films of a lower thickness allow more economical and lighter containers to be produced.

The invention claimed is:

1. A bio-based and biodegradable composition comprising:
    a first biodegradable polymer, wherein the first biodegradable polymer is a thermoplastic starch, in a proportion >=52% by weight based on the overall composition;
    a second biodegradable polymer, wherein the second biodegradable polymer is not a thermoplastic starch, in a proportion <=48% by weight based on the overall composition; and
    a latex polymer, in a proportion higher than 0% and lower than 1% by weight based on the overall composition,
    wherein the thermoplastic starch is in a co-continuous or continuous phase,
    wherein the latex polymer is selected from the group consisting of synthetic latex, natural latex and a combination thereof,
    wherein the synthetic latex is selected from the group consisting of styrene-butadiene, acrylonitrile butadiene styrene, vinyl acetate homopolymers, vinyl acetate copolymers, acrylic ester homopolymers, methacrylic ester homopolymers, acrylic ester copolymers, methacrylic ester copolymers, and a combination thereof,
    wherein the acrylic ester copolymer consists of reactive groups that make the acrylic ester copolymer act as a binder between the thermoplastic starch and the second biodegradable polymer,
    wherein the reactive groups are selected from the group consisting of carboxyl, anhydride, alcohol, carbodiimide and oxazoline group, and
    wherein the reactive groups are adapted to react during the manufacture of the composition both with hydroxyl groups of the starch and with groups of the second biodegradable polymer.

2. The bio-based and biodegradable composition according to claim 1, wherein the natural latex is extracted from a tree selected from the group consisting of *Hevea Brasiliensis, Manilkara Bidentata, Manilkara Zapota* and *Palaquium Oblongifolia*.

3. The bio-based and biodegradable composition according to claim 1, wherein the second biodegradable polymer is selected from the group consisting of aliphatic-aromatic copolyesters, polylactic acid, polyhydroxybutyrate, polyhydroxybutyrate-hydroxyvalerate copolymers, aliphatic copolyesters, aliphatic polyesters including units formed from a hydroxy acid, polyesters including units formed from glycolide, lactide and [epsilon]-caprolactone, polyester-urea, polyester amides, polyesteretheramides, aliphatic-aromatic polyesteretheramides, and a mixture thereof.

4. The bio-based and biodegradable composition according to claim 3, wherein the second biodegradable polymer is a polyesteretheramide that contains a monomer with at least 3 groups capable of reacting with one or several types of the active groups present in the reaction mass.

5. The bio-based and biodegradable composition according to claim 1, wherein the thermoplastic starch comprises starch and a plasticizer.

6. The bio-based and biodegradable composition according to claim 5, wherein the plasticizer is selected from the group consisting of polyhydric alcohols, ethers, thioethers, the esters of these and a combination thereof.

7. The bio-based and biodegradable composition according to claim 5, wherein the starch is selected from the group consisting of native, chemically modified and a mixture thereof.

8. The bio-based and biodegradable composition according to claim 1, wherein the thermoplastic starch comprises starch and glycerine.

* * * * *